Feb. 8, 1949.   F. J. GROSE   2,461,378
CONTROL DEVICE FOR MULTIPLE LINEARLY MOVABLE MEMBERS
Filed June 30, 1947
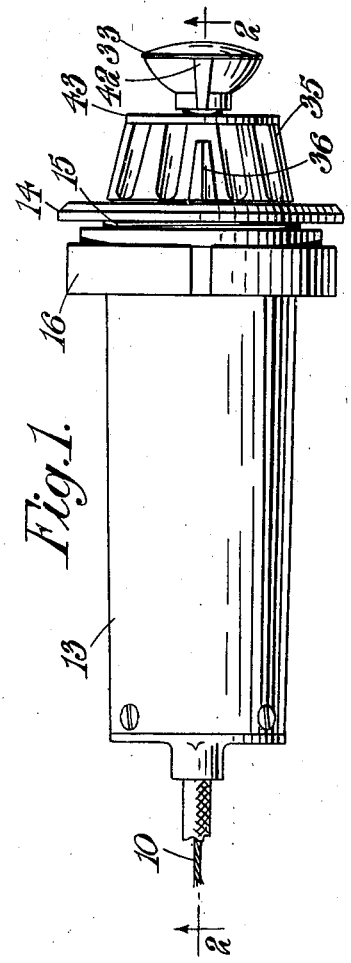
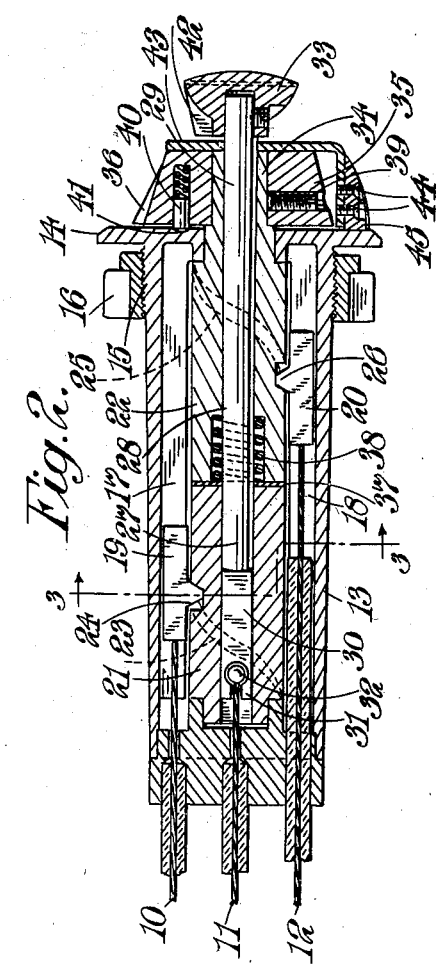
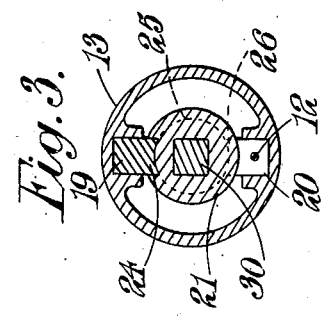
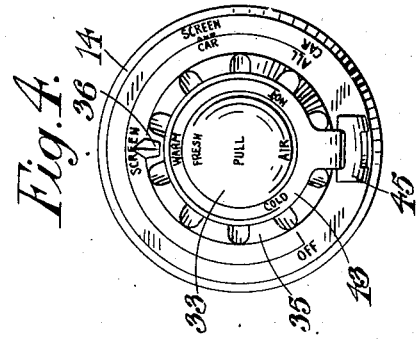
INVENTOR
F. J. Grose
By Watson, Cole, Grindle & Watson Patented Feb. 8, 1949

2,461,378

UNITED STATES PATENT OFFICE 2,461,378

CONTROL DEVICE FOR MULTIPLE LINEARLY MOVABLE MEMBERS

Frederick Joseph Grose, Cricklewood, London, England, assignor to S. Smith & Sons (England) Limited, London, England, a British company Application June 30, 1947, Serial No. 758,023
In Great Britain July 16, 1946

1 Claim. (Cl. 74—501)

This invention relates to control devices for multiple linearly movable members, such, for example, as Bowden cables, and has for an object the operation of a number of such members by means of a lesser number of operating members.

According to this invention, a control device for two linearly movable members comprises a threaded rotatable member having its thread so connected with one of the movable members that it is moved linearly by the rotation of the threaded member, an operating member engaging said rotatable member so as to impart rotation thereto while permitting axial movement of the operating member relatively thereto, and means for connecting said operating member to the second movable member. With this arrangement, a single operating member is employed for independently controlling the linear movement of the two movable members.

In the case where a third rectilinearly movable member requires to be operated, a second rotatable threaded member connected to a second operating member may have its thread so connected with the third movable member that linear movement is imparted to that member by rotation of the second rotatable member, which second rotatable member encircles and is rotatable on the first operating member.

In applying the invention to moving three Bowden cables, the ends of two of said cables may be connected to blocks slidable in straight grooves formed in the internal surface of a casing encircling the rotatable members which are externally threaded, which blocks are provided with projections which engage respectively the threads of the aforesaid rotatable members, while the end of the third cable is connected to the first said operating member through a joint permitting relative rotation between those parts.

The following is a more detailed description of one embodiment of the invention for operating three Bowden cables, reference being made to the accompanying drawings, in which:

Figure 1 is a side elevation of the apparatus,

Figure 2 is a section on the line 2—2 of Figure 1,

Figure 3 is a section on the line 3—3 of Figure 2, and

Figure 4 is a view looking from the right of Figure 2.

The three Bowden cables 10, 11 and 12 shown in Figure 2 are intended for controlling apparatus for heating the interior of a motor vehicle. The heating apparatus (not shown) is of the kind in which fresh air passes through a fresh air valve to two ducts in parallel. One of these ducts is a hot air duct passing through a heat exchanger and the other is a cold air duct. The hot and cold air from these two ducts are mixed in suitable proportions by means of a mixing valve and directed into the interior of the motor vehicle where a distributor directs the air either into the vehicle, on to the screen, or both. The cable effects operation of the mixing valve, the second cable effects operation of the fresh air valve, and the third cable effects operation of the distributor.

The control mechanism comprises a cylindrical case 13 provided with a flange 14 and with a threaded portion 15 which is passed through a hole in the dashboard of the vehicle, and engaged by a clamping nut 16. The casing is provided with two axially-extending grooves 17 and 18 on the inner surface in which slide two linearly moving members 19 and 20 secured to the first and third cables respectively. Rotatably arranged within the casing are two cylindrical members 21, 22. The member 21 is provided with a helical thread of large pitch engaging a projection 24 on the member 19 connected to the first cable 10 so that rotation of that member effects linear movement of the first cable; similarly, the other cylindrical member 22 is provided with a helical thread 25 which engages a projection 26 on the member 20 which is connected to the third cable 12 so that rotation of that member effects linear movement of the third cable 12. The first said cylindrical member 21 has a bore 27 of square cross-section, while the other cylindrical member 22 has a bore of circular cross-section 28. A shaft 29 extends through this bore and the part 30 engaging the square section bore 27 is of square cross-section so that rotation of the shaft will effect rotation of the first said cylindrical member 21. The part of the shaft which is of square cross-section does not extend for the full length of the square section bore, so that this part can be moved axially along the bore. The second cable 11 is attached to the end of the square section part of the shaft by means of a spherical nipple 31 which engages a ball 32 secured to the end of the cable, permitting relative rotation between the cable and the shaft. The other end of the shaft has secured to it a control knob 33 whereby the shaft may either be rotated or moved axially. The cylindrical member 22 with the circular section bore is provided with an extension 34 to which another manipulating knob 35 is secured by a set-screw 39 whereby said part may be rotated. The manipulating member 35 may be returned in a desired position by a spring pressed detent 40 housed in it and which is engageable with one of a number of depressions 41 in the flange 14. The two manipulating knobs and the outer face of the flange are suitably inscribed as shown in Figure 4. For example, the end face of the first manipulating member 33 may be marked "Fresh air pull" and a pointer 42 on that knob may traverse legends on a plate 43 which overlies the knob 35 and is secured by set-screws 44 to a lug 45 fixed to the flange 14. These legends may comprise the words "Cold," "Warm," "Hot." A pointer 36 on the knob 35 may traverse legends on the flange marked "Off, Screen, Screen and Car, All Car." The two cylindrical members 21, 22 are separated by a washer 37 loaded by means of a spring 38 to apply frictional damping to the rotational movement of these members.

In operation, the first cable 10 can be pushed or pulled by rotation of the first said manipulating knob 33 in one direction or the other. The second cable 11 can be pushed or pulled by pushing or pulling the first said knob 33 and the third cable 12 can be pushed or pulled by rotating the second said knob 35 in one direction or the other.

I claim:

A control device for moving three Bowden cables comprising a casing having two straight grooves formed in the internal surface thereof, two blocks attached respectively to two of the cables and slidable respectively in said grooves and each having an inwardly extending projection, two externally threaded members arranged end to end and rotatable but fixed against axial movement in said casing and engaged respectively by said projections, each of which threaded members is provided with a bore, an operating member extending freely through the bore in one member and axially slidable but non-rotatable in the bore of the other threaded member which operating member is connected to the third cable and another operating member adapted independently to rotate the first said threaded member.

FREDERICK JOSEPH GROSE.

REFERENCES CITED

The following references are of record in the file of this patent:

UNITED STATES PATENTS

| Number | Name | Date |
| --- | --- | --- |
| Re. 18,731 | Weatherhead | Feb. 7, 1933 |
| 1,101,692 | Goodspeed | June 30, 1914 |
| 1,221,925 | Trott | Apr. 10, 1917 |
| 1,905,539 | White | Apr. 25, 1933 |
| 2,039,093 | Lewis | Apr. 28, 1936 |
| 2,244,464 | Link | June 3, 1941 |